(12) United States Patent  
Friedl et al.

(10) Patent No.: US 8,706,722 B2  
(45) Date of Patent: *Apr. 22, 2014

(54) SYSTEMS AND METHODS FOR ADAPTIVE SCHEDULING OF REFERENCES TO DOCUMENTS

(75) Inventors: Jeffrey E. F. Friedl, Kyoto (JP); Kathleen L. Hartnack, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,077

(22) Filed: May 31, 2012

(65) Prior Publication Data

US 2012/0239490 A1 Sep. 20, 2012

Related U.S. Application Data

(63) Continuation of application No. 12/169,942, filed on Jul. 9, 2008, now Pat. No. 8,214,358, which is a continuation of application No. 10/897,064, filed on Jul. 22, 2004, now Pat. No. 7,539,674.

(60) Provisional application No. 60/561,142, filed on Apr. 8, 2004.

(51) Int. Cl.  
*G03F 7/00* (2006.01)

(52) U.S. Cl.  
USPC ........... 707/727; 707/748; 707/751; 709/224; 709/226; 705/7.29; 705/14.45

(58) Field of Classification Search  
USPC .......... 707/999.104, 727, 748, 751; 705/7.29, 705/14.45; 709/224, 226  
See application file for complete search history.

(56) References Cited

U.S. PATENT DOCUMENTS

| | | | |
|---|---|---|---|
| 6,163,778 A | 12/2000 | Fogg et al. | |
| 6,643,612 B1 | 11/2003 | Lahat et al. | |
| 6,718,324 B2 * | 4/2004 | Edlund et al. | 1/1 |
| 7,031,961 B2 | 4/2006 | Pitkow et al. | |
| 7,930,206 B2 * | 4/2011 | Koningstein | 705/14.45 |
| 2002/0075302 A1 | 6/2002 | Simchik | |
| 2004/0006747 A1 | 1/2004 | Tyler | |
| 2004/0133469 A1 * | 7/2004 | Chang | 705/14 |
| 2004/0255237 A1 | 12/2004 | Tong | |
| 2005/0060297 A1 | 3/2005 | Najork | |
| 2005/0071741 A1 * | 3/2005 | Acharya et al. | 715/500 |
| 2005/0086105 A1 * | 4/2005 | McFadden et al. | 705/14 |
| 2005/0131762 A1 * | 6/2005 | Bharat et al. | 705/14 |

* cited by examiner

*Primary Examiner* — Hosain Alam  
*Assistant Examiner* — Jieying Tang  
(74) *Attorney, Agent, or Firm* — Brinks Gilson & Lione

(57) ABSTRACT

The order and type of display of documents may be updated or adaptively scheduled. The documents may include advertisements and articles that are displayed together. A popularity or selection weight of the documents may be monitored and used to determine when and where to display the documents.

20 Claims, 11 Drawing Sheets

| User 1 personal profile | 64-1 |
|---|---|
| Name | 500-1-1 |
| Address | 500-1-2 |
| Country / Geographical location | 500-1-3 |
| Gender | 500-1-4 |
| Date of birth (age) | 500-1-5 |
| Occupation | 500-1-6 |
| Interest / Hobby | 500-1-7 |
| Language | 500-1-8 |
| Political affiliation | 500-1-9 |
| Education level | 500-1-10 |
| Profession | 500-1-11 |
| Income level | 500-1-12 |
| Academic background | 500-1-13 |
| Frequency of use | 500-1-14 |
| E-mail address | 500-1-15 |
| ⋮ | |
| User 2 personal profile | 64-2 |
| ⋮ | |
| User N personal profile | 64-N |

| AGE | PRIORITY | | | | CLICK RATE | ARTICLE | POPULARITY |
|---|---|---|---|---|---|---|---|
| | BASE | FORCE | FINAL | PIE% | | | |
| 10.6 HR | 62 | +75 | 137 | 16% | 898/HR | WHY DIVIDENDS MATTER | (106%) |
| | UPDATED BY EDITOR 9 MINUTES AGO | | | | | | |
| 1.0 DAY | 39 | -75 | 114 | 13% | 5,968/HR | INVESTING IN REAL ESTATE | (137%) |
| | UPDATED BY EDITOR 2.1 HOURS AGO | | | | | | |
| 8 MIN | 100 | NONE | 100 | 11% | 701/HR | 5 STOCK PICKS FOR APRIL | (113%) |
| 9 MIN | 99 | NONE | 99 | 11% | 6,554/HR | DAY TRADING WINNERS | (95%) |
| 9 MIN | 99 | NONE | 99 | 11% | 1,666/HR | NEW DRUGS GET FDA APPROVAL | (27%) |
| 2.1 HR | 96 | NONE | 96 | 11% | 8,862/HR | INVESTING 101 | (145%) |
| 1.9 HR | 96 | -10 | 86 | 10% | 2,660/HR | INVESTING IN MUTUAL FUNDS | (49%) |
| | UPDATED BY EDITOR 8 MINUTES AGO | | | | | | |
| 10.9 HR | 61 | NONE | 61 | 7% | 4,622/HR | 2003 BEST PICKS | (112%) |
| 10.8 HR | 61 | NONE | 61 | 7% | 3,994/HR | TOP MONEY MANAGER PICKS | (105%) |
| 1.0 DAY | 39 | -10 | 29 | 3% | 2,224/HR | SOLID GROWTH COMPANIES | (125%) |
| | UPDATED BY EDITOR 19.3 HOURS AGO | | | | | | |

*FIG. 11*

SYSTEMS AND METHODS FOR ADAPTIVE SCHEDULING OF REFERENCES TO DOCUMENTS

PRIORITY CLAIM

This application is a continuation of U.S. application Ser. No. 12/169,942, filed Jul. 9, 2008, which is a continuation application of U.S. application Ser. No. 10/897,064, filed Jul. 22, 2004, now U.S. Pat. No. 7,539,674 issued on May 26, 2009, which claims priority under 35 U.S.C. §119(e) to Provisional App. Ser. No. 60/561,142, filed Apr. 8, 2004, each of which are hereby incorporated by reference.

FIELD OF THE INVENTION

This invention relates to systems and methods for adaptive scheduling of references to documents. The references are included as components of a web page that is made available to a user population.

BACKGROUND OF THE INVENTION

The hosting of web portals such as Yahoo.com is competitive. Central to such businesses is the attraction of a large number of users to the portal and keeping such users interested in the portal content. Portal search engine quality is one method for attracting users. However, more is needed to keep users at the portal site, as opposed to linking away from the portal to sites identified by search engine results. Although the way in which advertising revenues are computed can vary, such revenues are generally dependent upon not only the number of viewers that are attracted to a portal, but also the length of time such users stay at the portal. Therefore, portals have worked to extend the amount of interesting content that is found directly at the portal in order to retain users at the portal.

One way to attract and keep users at a portal is to provide useful information including, for example, breaking headline news, financial news stories, feature articles, stock quotes and the like. Such information attracts users to the portal and helps to retain such users at the portal for longer periods of time. However, users have unique interests. What one user finds to be noteworthy, another may find uninteresting. To attract a high volume of users, it is necessary to offer a wide array of topics at the portal web site. This puts a strain on the total web page real estate available at the portal. Of course, informational topics can be nested, so that the portal main page includes a series of links to other pages. While this technique is useful, it is somewhat unsatisfactory because it requires the users to spend a considerable amount of time sorting through lists of topics in order to find a topic that interests the user. Thus, when overused, links to other pages causes users to drop off to sites other than the portal, adversely affecting advertising and related revenue.

Thus, to remain competitive, web portals, as well as other entities interested in attracting large volumes of users to their web sites, have devised methods to reduce web site clutter while at the same time attempting to maximize user interest in the content that is offered on the web site. However, such attempts have been problematic. For example, user interests are constantly changing. What is an interesting story on one day to many users may suddenly become a story that enjoys very little user interest the next day. Furthermore, wrong choices can be made. For instance, a web site editor may select a news story that enjoys little to no popular interest.

Given the above background, what is needed beyond the prior art are improved methods for selecting topics to be displayed on a web site. The present invention addresses these and other shortcomings in the known art.

SUMMARY OF THE INVENTION

The present invention provides systems and methods for gauging user interest in topics such as news articles. In one embodiment, a panel of candidate documents is gathered by an editor. To reduce screen clutter, only references to a subset of the panel of documents is displayed on a web site at any given time. In fact, each time a user opens the web site, a different subset of the panel of documents is selected and references to the selected documents are displayed. Each candidate document is assigned a weight. Candidate documents are included in a displayed subset of documents as a function of their weight. More heavily weighted documents will be selected for display more frequently than less heavily weighted documents. The number of times users select each document is tracked over a look back period. Documents that have been frequently selected by users are reassigned heavy weights and documents that have been infrequently chosen are assigned lighter weights. In this way, screen clutter is avoided, while, at the same time, user feedback is used to reinforce the weights of documents that are of interest to users.

Other embodiments of the invention provide related systems and methods for gauging user interest. For example, in one embodiment, a web page promotes a feature article with a teaser. The teaser can provide, for example, a digital picture associated with the feature article, the title of the feature article, the first paragraph of the feature article, or any other information that will convey the general or specific nature of the feature article. Such a web page can include a broad array of other components in addition to the teasers that are each designed to interest the user in selected topics. In the invention, there can be a single teaser or a plurality of teasers for the same feature article, with each teaser conveying information about the feature article. In some embodiments, each time a viewer views a designated web page associated with the portal, a teaser is selected from the plurality of teasers with a probability proportional to a weight associated with the teaser. Periodically, a determination is made as to which teasers are successful in causing the user to select the article associated with the teaser. Those teasers that are successful are up-weighted relative to unsuccessful teasers.

In still another embodiment of the invention, a collection of ideas relating to a central topic are collected. An example of such a collection is news articles about topics of general interest (e.g., investment ideas). To reduce screen clutter and to free up screen real estate for other web page components, only references to a subset of the collection of ideas is displayed on the web page. Periodically, the percentage of time that a reference to each respective idea is displayed is compared to the percentage of times users actually select (hit) the respective idea. An idea that received a percentage of hits that was larger than the percentage of time that the reference to the idea was displayed during a look back period is up-weighted so that it will be displayed more frequently in the future. An idea that received a percentage of hits that was less than the percentage of time that the reference to the idea was displayed during a look back period is down-weighted so that it will be displayed less frequently in the future.

One embodiment of the present invention comprises a computer program product for use in conjunction with a computer. The computer program product comprises a computer readable storage medium and a computer program mechanism embedded therein. The computer program mechanism comprises a document data structure and a document selection module. The document data structure comprises a plurality of documents. Each respective document in the plurality of documents includes (i) a corresponding designation of a number of times the respective document was requested in a given time period and (ii) a selection weight. The document selection module includes a set of instructions for each respective document in the plurality of documents. The set of instructions for a respective document includes instructions for monitoring, updating, and adjusting. The instructions for monitoring and updating track the number of times the respective document was requested in the given time period. The instructions for adjusting adjust the selection weight corresponding to the respective document based upon the number of times the respective document was requested in a given time period relative to a total number of document requests during the given time period.

Another aspect of the invention provides a computer program product for use in conjunction with a computer. The computer program product comprises a computer readable storage medium and a computer program mechanism embedded therein. The computer program mechanism comprises a document data structure and a document selection module. The document data structure comprises a plurality of documents, where each respective document in the plurality of documents includes (i) a corresponding first designation of a number of times the respective document was requested in a given time period by a first class of users, (ii) a corresponding second designation of a number of times the respective document was requested in the given time period by a second class of users, (iii) a corresponding first selection weight, and (vi) a corresponding second selection weight. The document selection module includes a set of instructions for each respective document in the plurality of documents. The set of instructions for a respective document includes instructions for adjusting the first selection weight corresponding to the respective document based upon the number of times the respective document was requested by the first class of users relative to a total number of document requests by the first class of users during a given time period. The set of instructions for a respective document further includes instructions for adjusting the second selection weight corresponding to the respective document based upon the number of times the respective document was requested by the second class of users relative to a total number of document requests by the second class of users during a given time period.

Still another aspect of the invention is a method of providing documents of interest to a user on a host web page. A request to view an instance of the host web page is received. A subset of documents from a plurality of documents is selected based on a selection weight associated with each respective document in the plurality of documents. A description of each document in the subset of documents is included as component in the host web page. Monitoring is performed to determine which documents in the subset of documents referenced by the host web page are selected by a user. These steps are repeated for each request to view an instance of the host web page that is received during a given time period. Once the given time period has elapsed, the selection weight associated with each respective document in the plurality of documents is adjusted based upon a number of times the respective document was selected by a user relative to the total number of times a document in the plurality of documents was selected by a user during the given time period.

Yet another aspect of the invention is a method of providing documents of interest to a user that is reviewing a host web page. A request to view an instance of the host web page by a user in a first user class is received. Responsive to this request, a subset of documents from a plurality of documents is selected based on a user class specific selection weight associated with each respective document in the plurality of documents. A description of each document in the subset of documents is included in the host web page. A determination is made as to which documents in the subset of documents referenced by the host web page are selected by users in the first user class. These steps are repeated for each request to view an instance of the host web page that is received during a given time period. Then, the user class specific selection weight associated with the respective document is adjusted based upon a number of times the respective document was selected by users in the first user class relative to a total number of times any document in the plurality of documents was selected by users in the first user class.

Still another aspect of the invention provides a computer program product for use in conjunction with a computer. The computer program product comprises a computer readable storage medium and a computer program mechanism embedded therein. The computer program mechanism comprises a teaser data structure and a teaser selection module. The teaser data structure comprises a single teaser or a plurality of teasers for a document. Each respective teaser in the plurality of teasers includes (i) a corresponding designation of a number of times the document was requested in a given time period while the respective teaser was being displayed on a host web site, and (ii) a corresponding selection weight. The teaser selection module includes, for each respective teaser in the plurality of teasers, instructions for monitoring, instructions for updating, and instructions for adjusting. The instructions for monitoring and updating monitor a number of times the document was requested in the given time period while the respective teaser was being displayed on the host web site and update the teaser data structure to include a record of this number of times. The instructions for adjusting adjust the selection weight corresponding to the teaser based upon the number of times the document was requested by users while the teaser was being displayed on the host web site relative to the total number of times the document was requested by users in the given time period.

BRIEF DESCRIPTION OF THE DRAWINGS

FIG. 5 illustrates a user profile in accordance with one embodiment of the present invention.

FIG. 11 illustrates the weight currently assigned to each news article in a set of news articles as well as article popularity.

Like reference numerals refer to corresponding parts throughout the several views of the drawings.

DETAILED DESCRIPTION OF THE DRAWINGS AND THE PRESENTLY PREFERRED EMBODIMENTS

The present invention provides systems and methods for identifying documents of interest to users. Typically, such documents are news and editorial articles, advertisements, teaser content for features of a web site, and the like.

System Overview

Figure 1:
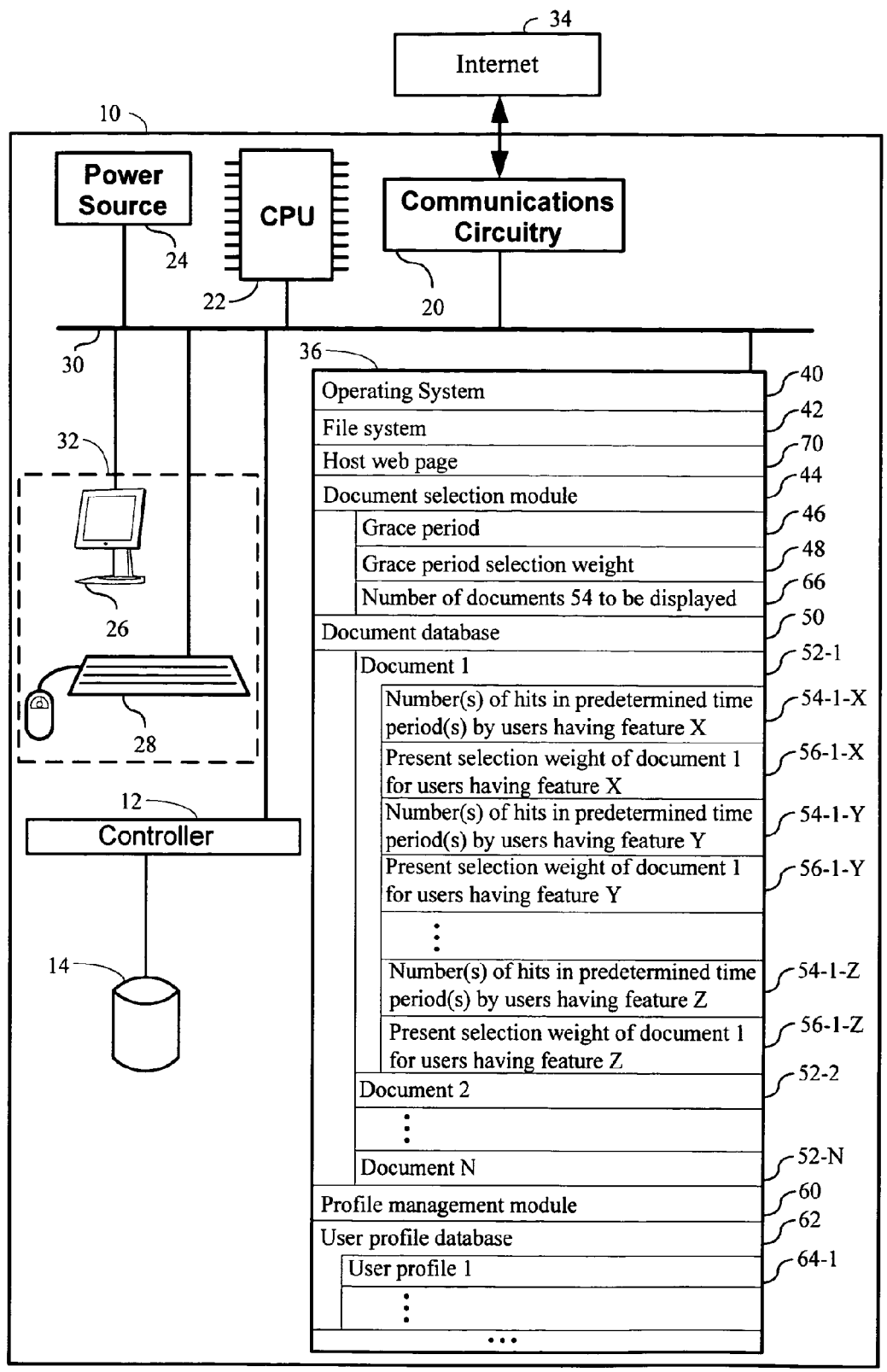
FIG. 1 illustrates a computer system capable of scheduling the appearance of references to topics of interest on a web site in accordance with one embodiment of the present invention.

A system 10 that supports functionality of the present invention is described in conjunction with FIG. 1. System 10 preferably includes:

- central processing unit (CPU) 22 (e.g., a full CPU such as an Intel pentium processor, an application-specific integrated circuit, a field-programmable gate array, or the like);
- a main non-volatile storage unit 14, for example a hard disk drive, for storing software and data, the storage unit 14 controlled by storage controller 12;
- a system memory 36, preferably high speed random-access memory (RAM), for storing system control programs, data, and application programs, including programs and data loaded from non-volatile storage unit 14; system memory 36 may also include read-only memory (ROM);
- a user interface 32, including one or more input devices (e.g., keyboard 28, mouse) and a display 26 or other output device;
- communications circuitry 20 for connecting to any wired or wireless communication network such as the Internet 34;
- a power source 24;
- an internal bus 30 for interconnecting the aforementioned elements of system 10.

Operation of system 10 is controlled primarily by operating system 40, which is executed by central processing unit 22. Operating system 40 can be stored in system memory 36. In a typical implementation, system memory 36 includes:

- operating system 40;
- file system 42 for controlling access to the various files and data structures used by the present invention;
- a host web page 70 for displaying links to various documents of interest;
- a document selection module 44 for determining which document links (e.g., header, link, teaser, etc.) to display on host web page 70;
- a document database 50 for storing documents for possible display on host web page 70 (and/or links to such documents);
- a document database 50 for storing documents for possible display on host web page 70 (and/or headers, links, or teasers for such documents);
- an optional profile management module 60 for managing user profiles 64; and
- an optional profile database 62 for storing user profiles 64.

In a typical embodiment of system 10, host web page 70, document selection module 44, document database 50, optional profile management module 60, and optional profile database 62 are stored on the same computer as illustrated in FIG. 1. However in embodiments not illustrated, system 10 in fact comprises multiple computers, with host web page 70 (and the software that serves host web page 70), document selection module 44, document database 50, optional profile management module 60 and profile database 62 partitioned onto any number of computers that are addressable with respect to each other across a computer network.

As illustrated in FIG. 1, system 10 includes a document database 50. Document database 50 comprises any form of data storage system, including but not limited to, a flat file, a relational database (SQL), and an on-line analytical processing (OLAP) database (MDX and/or variants thereof). In some specific embodiments, document database 50 is a hierarchical OLAP cube. In some specific embodiments, document database 50 comprises a star schema that is not stored as a cube but has dimension tables that define hierarchy. Still further, in some embodiments, document database 50 has hierarchy that is not explicitly broken out in the underlying database or database schema (e.g., dimension tables that are not hierarchically arranged).

As further illustrated in FIG. 1, system 10 optionally includes a user profile database 52. Like document database 50, user profile database 62 comprises any form of data storage system, including but not limited to, a flat file, a relational database (SQL), and an on-line analytical processing (OLAP) database (MDX and/or variants thereof). In some specific embodiments, user profile database 62 is a hierarchical OLAP cube. In some specific embodiments, user profile database 62 comprises a star schema that is not stored as a cube but has dimension tables that define hierarchy. Still further, in some embodiments, user profile database 62 has hierarchy that is not explicitly broken out in the underlying database or database schema (e.g., dimension tables that are not hierarchically arranged).

The embodiment illustrated in FIG. 1 is that of a computer-based implementation of the present invention. In some embodiments in accordance with FIG. 1, document selection module 44 and/or profile management module 62 is implemented as a web-based application that can be run in a browser such as Windows Explorer or Netscape Navigator. In some embodiments, document selection module 44 and/or profile management module 62 are implemented as independent programs that can be run directly through operating system 40.

Tracking Document Requests

Figure 2:
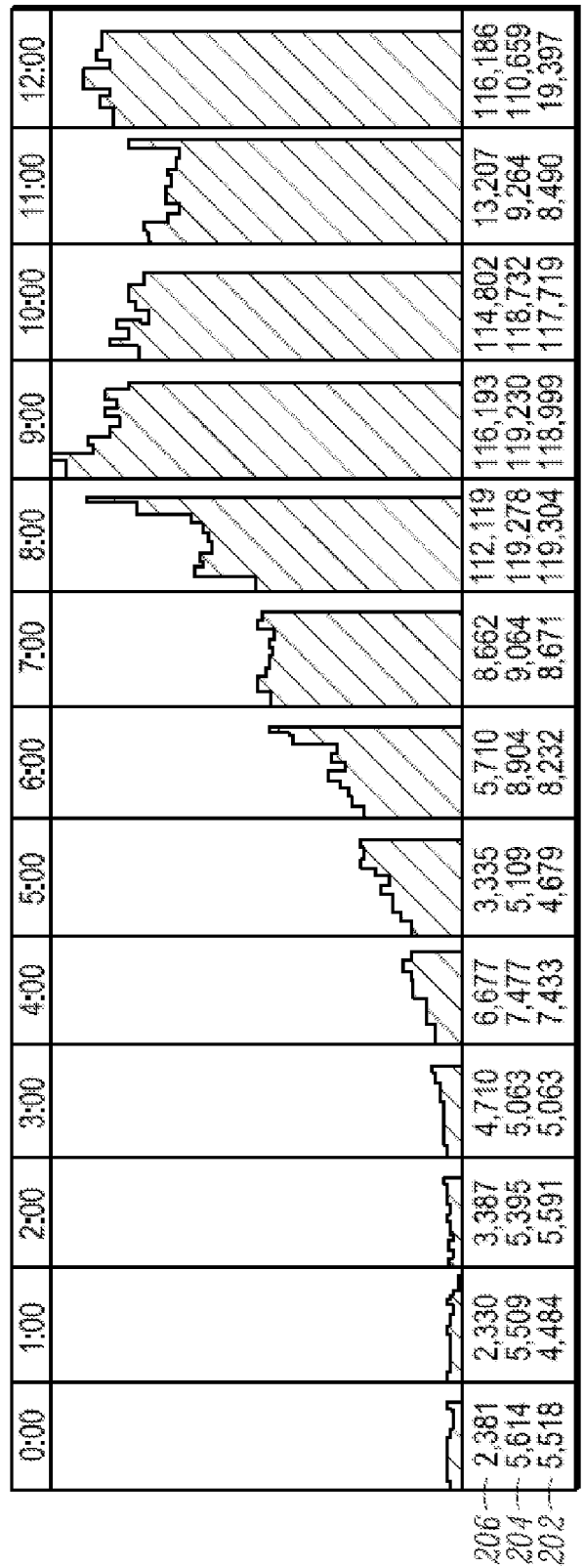
FIG. 2 illustrates the total number of requests for news articles during discrete time periods, median number of total requests for news articles during comparable discrete time periods (e.g., same time period on all Fridays), and median number of total requests for news articles on all corresponding time periods (e.g., same time period on all days).

Line 202 of chart 200 (FIG. 2) discloses the total number of document requested from a host web page 70 at discrete time periods (predetermined time periods) during a given Friday. For example, chart 200 shows how there are more document requests at 9:00 A.M. then at 2:00 A.M. For comparative purposes, line 204 of chart 200 shows the median number of document requests that were made during comparable periods on other Fridays. Further, lines 206 of chart 200 shows the median number of document requests that were made during comparable periods on all days. For example, line 202 of chart 200 indicates that some 116,193 document requests were made between 9:00 A.M. and 10:00 A.M. on a particular Friday represented by the graph. Line 204 of chart 200 indicates that, historically, some 119,230 document requests are made between 9:00 A.M. and 10:00 A.M. on Fridays. Next, line 206 of chart 200 indicates that, historically, 118,999 documents are requested between 9:00 A.M. and 10:00 A.M. Advantageously, in accordance with the methods of the present invention, the information disclosed in FIG. 2 is used to determine which subset of documents links in a plurality of documents links should be displayed on the host web page 70.

Figure 3:
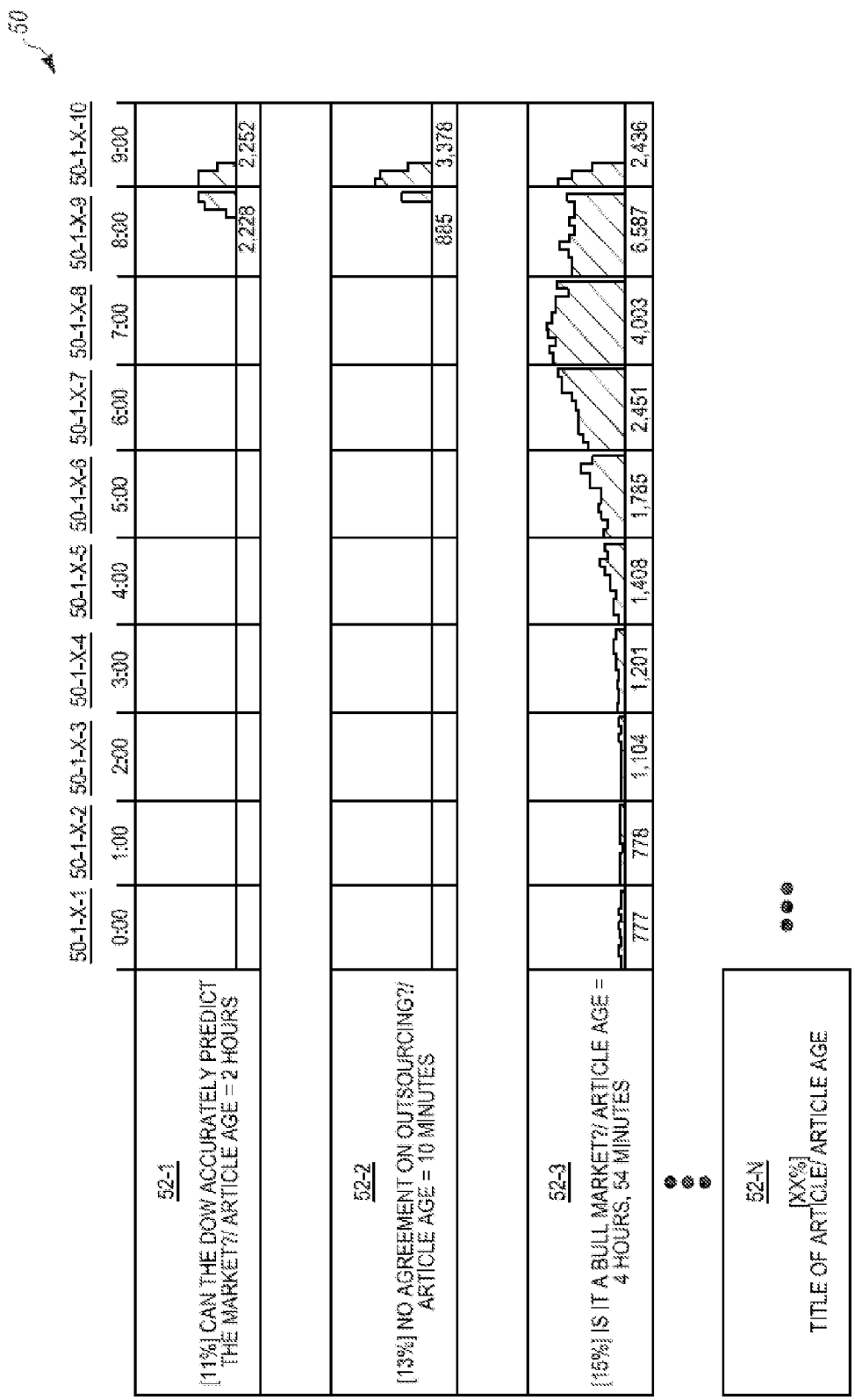
FIG. 3 illustrates the number of requests for specific news articles during discrete time periods.

FIG. 1 and FIG. 3 illustrate a portion of a document database 50 in accordance with an embodiment of the present invention. Document database 50 includes a number of documents 52. In typical embodiments, each document 52 is a news article, an editorial article, an investing tip, an advertisement, or some other newsworthy content. In some embodiments, each document 52 is a linked individual web page with optional scrolling and non-scrolling areas, text, and optional images or other media. However, the present invention is not limited to such documents. More broadly, a document is an electronic data compilation of any kind. Typically, when a link on host web page 70 is selected by a user, the user browser is redirected to the document corresponding to the link and the document is displayed as a web page. However, this is not always the case. In some embodiments, when a link on host web page 70 is selected by a user, the document corresponding to the link is loaded as a component in the host web page 70. In fact, in some embodiments, a document can be a program, written in compute code such as Java that is executed as a component within host web page 70.

FIG. 3 illustrates the concept of tracking links to documents. In FIG. 3, the titles of three news articles are depicted. Here, the titles of the three news articles serves as links to the news articles. Each title is displayed on a host web page 70 (FIG. 1). When a user selects a title they are redirected to the corresponding news article. As such, each news article is considered a document 52. The database 50 illustrated in FIG. 3 also shows the number of times each of the news articles is requested from a host web page 70. For example, the database 50 shows that the news article "Can the Dow accurately predict the market?" was selected by users between 8:00 A.M. and 9:00 A.M. a total of 2,228 times. The value 2,228 is stored in the field 54 that corresponds to this news article in database 50.

In the embodiment of database 50 illustrated in FIG. 3, the selection weight 56 of each news article is shown. For example, the news article "Can the Dow accurately . . . " 52-1 has a selection weight 56-1 of eleven percent. This means that the title or some other indicia of news article 52-1 will be selected for display on host web page 70 eleven percent of the time. News article "No Agreement to outsourcing?" 52-2 has a selection weight 56-2 of thirteen percent. This means that the title or some other indicia of news article 52-2 will be selected for display on host web page 70 thirteen percent of the time.

Automated Up-Weighting and Down-Weighting Methodologies

Figure 4:
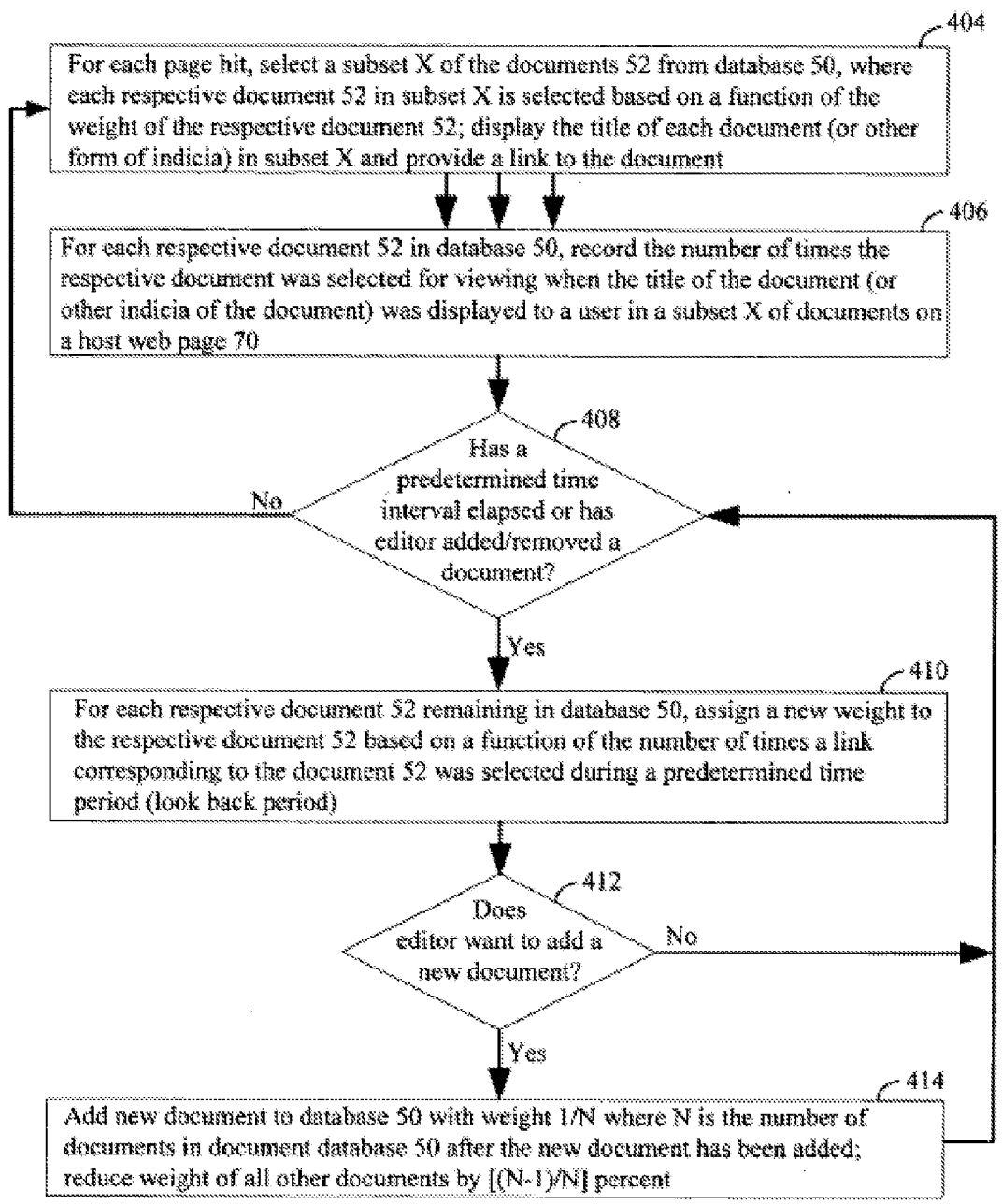
FIG. 4 illustrates processing steps that are taken to assign selection weights to news articles in accordance with one embodiment of the present invention.

Referring to FIG. 4, a method for automatically adjusting selection weights 56 assigned to documents in document database 50 is disclosed.

Step 404.

In step 404 of the method, a request to view a host web page 70 is made. An example of a host web page is finance.yahoo.com. In general, host web page 70 is any web page that provides links to a subset of a plurality of documents in database 50. In typical embodiments, host web page 70 includes other components as well, such as images, links to documents other than the documents found in document database 50, and active components such as a query field. Users in a network addressable by system 10 request host web page 70 either by selecting another web page that links to host web page 70 or by directly specifying the URL that corresponds to host web page 70 in their Internet browsers. Examples of Internet browsers include but are not limited to Internet Explorer (Redmond, Wash.) and Netscape Navigator (Time Warner Inc., New York, N.Y.).

In typical implementations of system 10 (FIG. 1), hundreds to thousands of users request host web page 70 during a predetermined time interval (e.g., five minutes). In other words, in typical embodiments, there are hundreds, thousands, tens of thousands, or event larger numbers of host web page 70 page views every hour. Each such page view initiates a new instance of step 404.

For each page view, a subset of the documents in database 50 is selected. For example, in some embodiments, there are between 1 and 5, between 4 and 11, between 9 and 16 or more than 15 documents 52 in database 50. In step 404, some subset of these documents 52 is selected. In some embodiments, one document 52 is selected from document database 50 in an instance of step 404. In some embodiments two, three, four, five, six, or more than six documents 52 are selected in an instance of step 404. In some embodiments, the number of documents to be selected for a subset of documents in step 404 is stored as field 66 in a data structure that is accessible to document selection module 44 (FIG. 1). Each document 52 is selected based upon a selection weight 56 associated with the document. In one embodiment, documents 52 that have higher corresponding selection weights 56 are selected more frequently than documents 52 that have lower corresponding selection weights 56.

An example illustrates an embodiment of the method. Consider the case where there are five documents 52 in document database 50 and that, in any given instance of step 404, a subset of documents consisting of two documents 52 from document database 50 is selected. Each of the five documents have selection weights as shown in Table 1:

TABLE 1

Exemplary document database 50 at step 404

| Document (52) | Selection Weight (56) [Percentile] | Indicia/Link |
|---|---|---|
| 52-1 | 50 | Can the Dow predict . . . ? |
| 52-2 | 10 | No agreements |
| 52-3 | 10 | Is it a bull market? |
| 52-4 | 10 | Title of document 4 |
| 52-5 | 10 | Title of document 5 |

Thus, the probability that document 52-1 will be selected for inclusion in a subset of documents in any given instance of step 404 is five times higher than the probability that any one of the other documents will be selected for inclusion in the subset of documents.

The title of each document 52 in the selected subset of documents is displayed on the host web page 70. For example, consider the case in which documents 52-1 and 52-3 were selected for inclusion in the subset of documents in an instance of step 404. Then, the title of document 52-1 ("Can the Dow predict . . . ?") and the title of document 52-3 ("Is it a bull market?") is displayed on host web page 70. In a preferred embodiment, when the user refreshes host web page 70, a whole other instance of step 404 is initiated in which a new subset of documents 52 is selected from document database 50 for display on host web page 70 based on selection weights 56. Thus, in the example above, refreshing host web page 70 can cause documents 52-1 and 52-3 to be replaced by any pair of documents 52 from document database 50 (e.g., documents 52-1 and 52-5).

In one embodiment, the title of each document 52 in the subset of documents is displayed in an instance of host web page 70. Then, when the user clicks or otherwise selects the title of a document 52 displayed on host web page 70, the user is redirected to the uniform resource location (URL) where the document 52 can be found. In some embodiments, the URL for each document 52 is stored in document database 52 whereas the document itself is stored on a device (e.g., computer) that is addressable by system 10. In other embodiments, each document 52 is wholly stored within document database 50. In some embodiments, rather than, or in addition to, displaying a document title, a digital image associated with the document is displayed in host web page 70 when the document is selected for display on web page 70.

Step 406.

In step 406, the number of times each document 52 in document database 52 is selected for viewing is recorded. In one embodiment, step 406 is implemented by using counters 54 in document database 50. Each respective document 52 in document database 50 includes a corresponding counter 54 that is used to count the number of times the respective document 52 was selected during a predetermined time interval (look back period, e.g., five minutes). Further, in some embodiments, such as those illustrated in FIG. 2, historical data beyond the look back period is tracked for evaluation purposes. To illustrate, consider the case in which the look back period is five minutes. Exemplary counters for the data in Table 1 are illustrated in Table 2:

TABLE 2

Exemplary document database 50 at step 406

| Document (52) | Selection Weight (56) [Percentile] | Indicia/Link | Number of hits (54) |
|---|---|---|---|
| 52-1 | 50 | Can the Dow predict . . . ? | 350 |
| 52-2 | 10 | No agreements | 100 |
| 52-3 | 10 | Is it a bull market? | 80 |
| 52-4 | 10 | Title of document 4 | 200 |
| 52-5 | 10 | Title of document 5 | 0 |

Table 2 shows that, although a link to document 52-4 has the same probability of appearing on host web page 70 as documents 52-2, 52-3, and 52-5 during the look back period, the document has received considerably more page hits than the other documents. In fact, the number of page hits that document 52-4 has received is almost comparable to the number of page hits that document 52-1 has received, even though a reference (link) to document 52-1 appears on instances of host web page 70 fives times more frequently than does a link for document 52-4.

Step 408.

In step 408, a determination is made as to whether a predetermined time interval, referred to herein as a look back period, has elapsed. In some embodiments, the look back period is a second, a minute, five minutes, one half hour, an hour. In other embodiments, the look back period is a predetermined value between one second and five hours. If the look back period has not elapsed (408—No) process control returns to step 404 where host web page 70 are processed in the manner described in steps 404 and 406 above.

In addition to the expiration of a predetermined time period, step 408 can be triggered (caused to enter the state 408—Yes) when an editor decides to add or remove a document from document database 50. In preferred embodiments, such events initiate a recomputation of the selection weights 54 of each document 54 that remains in the database 50 after the editor has added and/or removed documents.

In some embodiments, the removal or addition of a document 52 to document database 52 is done manually by an editor when the editor determines that such an adjustment to the database needs to be made. In other embodiments, the editor is a computer program module that adds and deletes documents to document database 52 in accordance with some predetermined algorithm. In practice, deletion of a document 52 in document database 50 can involve setting a flag (not shown) in database 50 to a "do not use setting," setting the selection weight of the document 52 to zero, or deleting the document 52 from document database 50 altogether.

Step 410.

When an editor has deleted document 52 from database 50 and/or the look back period has elapsed (412—Yes), the selection weight 56 for each document 52 is recomputed. In a preferred embodiment, each respective document 52 is assigned a new selection weight 56 based on the number of hits to the respective document 52 during the look back period. For example, consider the case in which the number of hits to each respective document 52 is given by Table 2 above. Then, in step 410, the new selection weights for the documents 52 will be as given in Table 3.

TABLE 3

Exemplary document database 50 at step 410

| Document (52) | Selection Weight (56) [Percentile] | Indicia/Link | Number of hits (54) |
|---|---|---|---|
| 52-1 | 350/730 | Can the Dow predict . . . ? | 350 |
| 52-2 | 100/730 | No agreements | 100 |
| 52-3 | 80/730 | Is it a bull market? | 80 |
| 52-4 | 200/730 | Title of document 4 | 200 |
| 52-5 | 0/730 | Title of document 5 | 0 |

In some embodiments, counters 54 are reset in step 410 to zero.

Step 412.

In step 412, a determination is made as to whether the editor wishes to include a new document 54 in document database 50. If so (412—Yes) process control passes to step 414. If not, process control passes to step 408 where each request for host web page 70 is processed as described in steps 404 through 408 above.

Step 414.

In step 414, new documents 54 added to document database 50 are assigned corresponding selection weights 56. Further, the selection weights 56 of original documents 54 in document database 50 are adjusted. In preferred embodiments, each new document 54 is assigned a grace period selection weight 48 (FIG. 1) for a grace period 46. In one embodiment, grace period 46 is one look back period. In other embodiments, grace period 46 is two or more look back periods. In one embodiment of the present invention, the grace period selection weight 48 is proportional to 1/N, where N is the number of documents 52 in document database 50 after the new document has been added. For example, consider the case in which an editor decides to add a document 52-6 to document database 50 when the database is in the state illustrated in Table 4. In such preferred embodiments, document 52-6 is assigned a selection weight 56 that is 1/6. Moreover, each of the original document selection weights 56 in document database 50 are reduced by [(N−1)/N] percent, where N is six. Thus, upon completion of step 414 in this example, the status of document database 50 is given by Table 4.

TABLE 4

Exemplary document database 50 at step 410

| Document (52) | Selection Weight (56) [Percentile] | Indicia/Link | Number of hits (54) (reset to zero) |
|---|---|---|---|
| 52-1 | (5/6) * (350/730) | Can the Dow predict . . . ? | 0 |
| 52-2 | (5/6) * (100/730) | No agreements | 0 |
| 52-3 | (5/6) * (80/730) | Is it a bull market? | 0 |
| 52-4 | (5/6) * (200/730) | Title of document 4 | 0 |
| 52-5 | (5/6) * (0/730) | Title of document 5 | 0 |
| 52-6 | 1/6 | Title of document 6 | 0 |

Class Designation in Automated Up-Weighting and Down-Weighting Methodologies

In some embodiments of the present invention, profile management module 60 is used to determine characteristics about users that request host web page 70. In preferred embodiments, host web page 70 is available to both users that have a profile 64 in system 10 as well as users that have no such profile. In such embodiments, the determination of characteristics about users that request a host web page 70 generally applies to only those users that have a user profile 64 in user profile database 62. Methods such as those disclosed with reference to FIG. 4 are implemented for those users that do not have a user profile.

The characteristics in the user profiles 64 of users requesting host web page 70 are used to stratify the user population into classes. Then, a different set of selection weights 56 is refined for each class of users based on the popularity of documents 54 within the class. In one example, the characteristic that is used to stratify the user population into classes is geography. Each user is classified into a different geographical region (e.g., state) based on the correspondence address of the user. Then, each document 52 is assigned a set of selection weights 56, one for each geographical region. In the case where the geographical region is a state, there will be 52 selection weights 56 for each document 52 in document database 50, one for each state. Then, each respective selection weight 56 for a document 54 is refined based upon the popularity of documents 52 with users in the user class corresponding to the respective selection weight. Such refinement proceeds in accordance with the steps outlined in FIG. 4.

Referring again to FIG. 5, an exemplary user profile 62 comprises a plurality of personal profiles 64. Each respective personal profile 64 in the plurality of personal profiles in profile database 62 uniquely represents a user of system 10. Typically, each personal profile 64 includes personal information about the user corresponding to the profile, including the user's name 500-x-1, mailing address 500-x-2, country of residence 500-x-3, and E-mail address 500-x-15. In some embodiments of the present invention, a personal profile 64 in database 62 includes personal information relating to the user corresponding to the personal profile 64. Such information can include, but is not limited to, gender 500-x-4, date of birth 500-x-5, occupation 500-x-6, any interests or hobbies 500-x-7 of the user, primary language 500-x-8 spoken by the user, political affiliation 500-x-9, education level 500-x-10, profession 500-x-11, income level 500-x-12, the academic background 500-x-13, and/or how often the user uses system 10 (frequency of use 500-x-14).

One embodiment of the present invention that makes use of user class designation comprises a computer program product for use in conjunction with a computer (e.g., system 10). The computer program product comprises a computer readable storage medium and a computer program mechanism embedded therein. The computer program product comprises a document data structure (e.g., document database 50) comprising a plurality of documents. Each respective document 52 in the plurality of documents includes at least a corresponding (i) first designation 54 of a number of times the respective document 52 was requested in a predetermined time period by a first class of users and (ii) second designation 54 of a number of times the respective document 52 was requested in the predetermined time period by a second class of users. Further, each respective document 52 in the plurality of documents includes at least (i) a corresponding first selection weight 56 and (ii) a corresponding second selection weight 56 corresponding to the respective document 52. Further, in such embodiments, document selection module 44 includes, for each respective document 52 in the plurality of documents (i) instructions for adjusting the first selection weight 56 corresponding to the respective document 52 based upon the number of times 54 the respective document was requested by the first class of users relative to a total number of document requests by the first class of users during a predetermined time period and (ii) instructions for adjusting the second selection weight 56 corresponding to the respective document 52 based upon the number of times the respective document was requested by the second class of users relative to a total number of document requests by the second class of users during a predetermined time period. In some embodiments, each user in the first class of users is associated with a first geographical region and each user in the second class of users is associated with a second geographical region. In some embodiments, each user in the first class of users is a first gender and each user in the second class of users is a second gender. In some embodiments, each user in the first class of users is in a first age range and each user in the second class of users is in a second age range. Still further, in some embodiments, each user in the first class of users speaks a first primary language and each user in the second class of users speaks a second primary language. In yet another embodiment, each user in the first class of users is in a first income bracket and each user in the second class of users is in a second income bracket.

Exemplary embodiments that include a first and second class of users have been described. However, the present invention encompasses architectures where the number of users classes is extended to much larger numbers, as in the case where U.S. citizens are classified by state. For instance, there can be between 1 and 5 user classes, between 4 and 10 users classes, between 9 and 21 user classes, more than 20 user classes, or more than fifty user classes.

Figure 6:
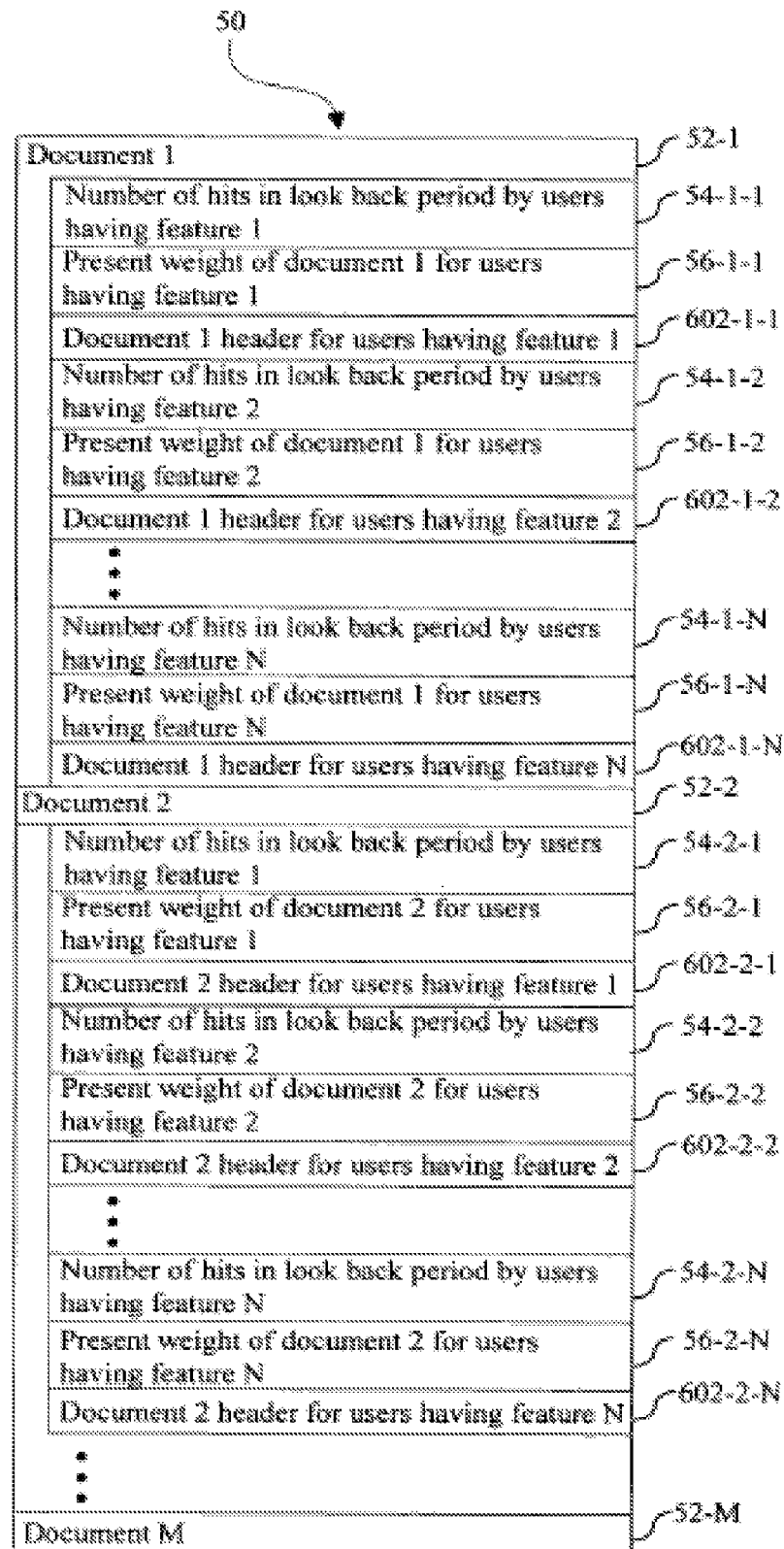
FIG. 6 illustrates a data structure for tracking the number of article requests during a look back period as a function of user feature (e.g., geography) in accordance with one embodiment of the present invention.

FIG. 6 illustrates a document database 50 that supports class designation. For instance, for document 52-1, there is a field 54-1-1 that tracks the number of hits (document 52-1 page requests) in the look back period by users having feature 1 (e.g., a first geographical association), the present weight 56-1-1 of document 52-1 for users having feature 1, a number of hits (document 52-1 page requests) in the look back period by users having feature 2 (e.g., a second geographical association) and so forth through feature N, where N is any number. As illustrated in FIG. 6, document 2 (52-2) through M also have such corresponding fields.

FIG. 6 further illustrates how, in some embodiments of the present invention, the document indicia (e.g., document title) for a document 52 that is displayed on host web page 70 when the document is selected for display on page 70 can potentially be different for each user class. For example, one picture or title can be used for document 52 when a user in a first class requests the document and another picture or title can be used for document 52 when a user in a second class requests the document. To support such functionality, for each document 52, there is a different document header 602 for each class of users as illustrated in FIG. 6. This document header includes a link to the corresponding document.

Teaser Selection for a Feature Article

Figure 7:
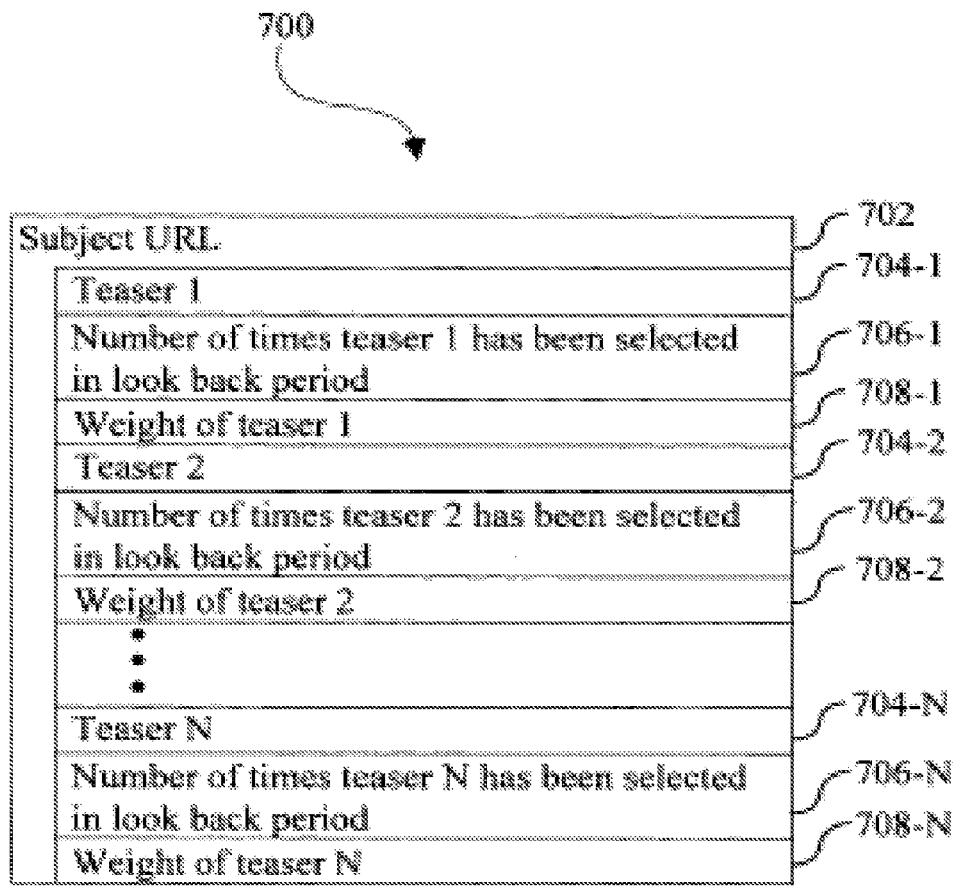
FIG. 7 illustrates a data structure for storing teasers and teaser selection weights in accordance with one embodiment of the present invention.
Figure 8:
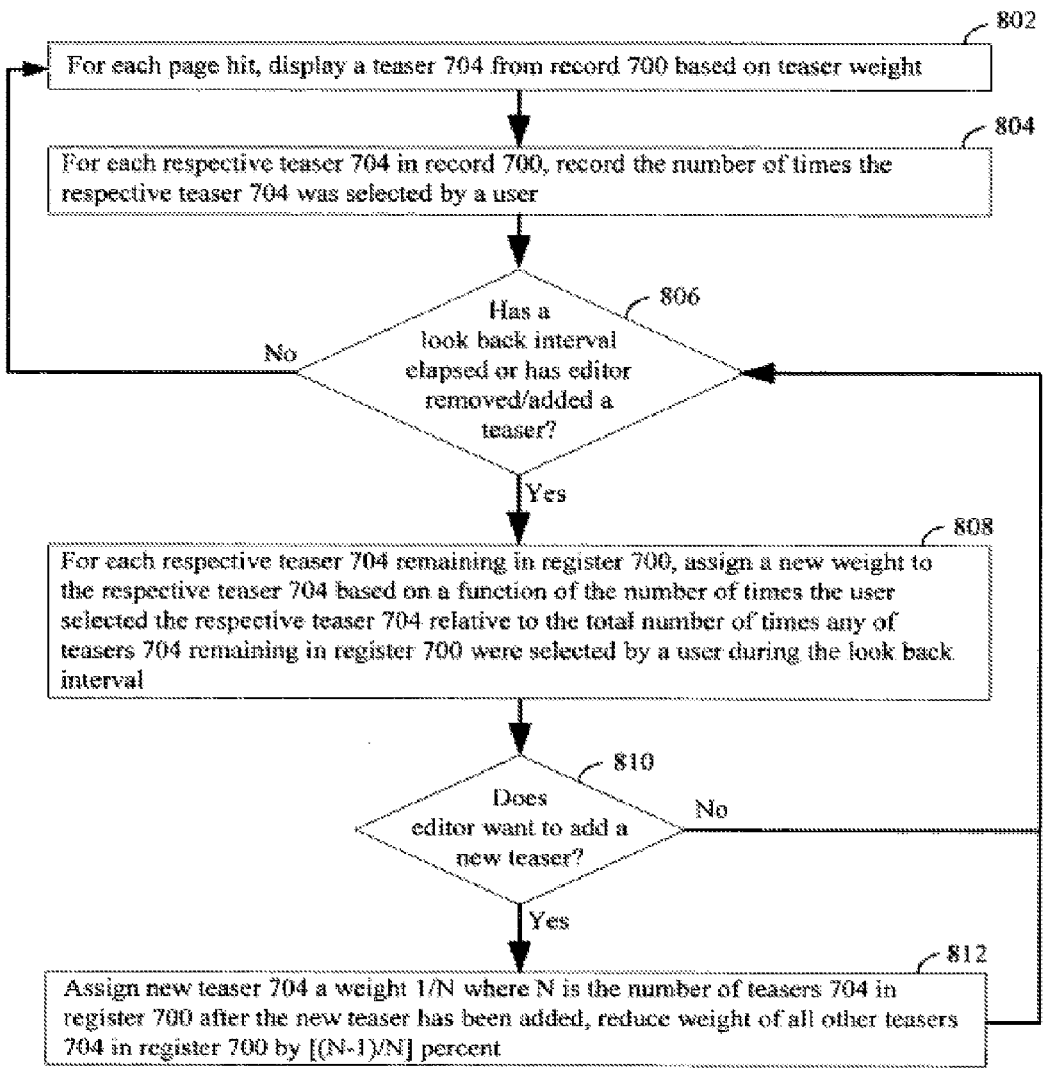
FIG. 8 illustrates processing steps that are taken to assign selection weights to article teasers in accordance with one embodiment of the present invention.

FIGS. 7 and 8 detail another novel application of the present invention. In order to effectively advertise a feature article on a host web page 70 without taking up too much of the available page real estate, a teaser can be used. The teaser can include the title of the feature article and/or a digital image associated with the article, or any other indicia relating to the feature article. For example, if the feature article concerns a celebrity, a recent picture of the celebrity can be shown in the teaser along with an attention grabbing synopsis of the feature article (e.g. "celebrity X arrested for drunk driving"). In the present invention, there can be a plurality of teasers for the feature article. Each time the host web page 70 is requested, one of the plurality of teasers is included in the web page based on a function of the selection weight of the teaser. In one embodiment, the higher the selection weight of a given teaser, the more likely it is that the given teaser will be selected for use in the host web page 70 when the page 70 is requested. When a user clicks on (or otherwise selects) the teaser that is on the host web page 70, the users is taken to the Uniform Resource Location (URL) where the article can be found. As in the case of document database 50, the feature article can be found in a database that houses the teasers, or in any data structure that is addressable by system 10.

FIG. 7 illustrates an exemplary data structure 700 that is used to house teasers in accordance with one embodiment of the present invention. In some cases, structure 700 is housed in memory 36 of system 10. Data structure 700 includes a plurality of teasers 704 for a feature article (or some other form of document). Further, structure 700 includes the URL 702 where the feature article can be found. For each teaser 704 there is a data construct (e.g., a field) 706 that tracks the number of times that the teaser was selected by a user during a look back period and the article viewed. Furthermore, for each teaser 704, there is a data construct 708 that stores the selection weight of the corresponding teaser. For example, weight 708-1 tracks the selection weight of teaser 704-1. In one embodiment, the higher weight 708-1, the higher the percentage of time teaser 704-1 will be selected for inclusion in an instance of host web page 70. In some embodiments, there are two teasers 704, three teasers 704, four teasers 704, or more than five teasers 704 in data structure 700.

FIG. 8 illustrates a method of using data structure 700. In step 802, a user requests to view a host web page 70. Accordingly, host web page 70 is dynamically constructed from the various components that make up the page 70. In the method illustrated in FIG. 8, one of the components that make up web page 70 is a teaser 704 for a feature article. In step 802 a teaser 704 is selected from record 700 based on teaser weight 708.

In step 804, the number of times each teaser 704 is used by a user to select the feature article during the look back period is recorded in fields 706 of data structure 700. Steps 802 and 804 continue until a loop back interval has elapsed or an editor adds or removes a teaser 704 from data structure 700 (step 806—Yes). When the condition 806—Yes arises, each respective teaser 704 remaining in register 700 is assigned a new weight 708 based on the number of times a user selected the respective teaser 704 relative to the total number of times any of teaser 704 remaining in register 700 were selected by a user in the look back period (step 808). For example, in accordance with one embodiment of the invention, if teaser 704-1 was selected 100 times during a given look back period, teaser 704-2 was selected 400 times during the same look back period and the only other teaser in data structure 700, 704-3 is removed by an editor, the new weight 708-1 for teaser 704-1 will be {fraction (100/500)} and the new weight 708—for teaser 704-2 will be {fraction (400/500)}.

In step 810, a determination is made as to whether the editor wishes to add a teaser. If so (810—Yes), process control passes to step 812 where the new teaser is assigned a grace period weight of 1/N, where N is the number of teasers 704 in data structure 700 after the new teaser has been added. Accordingly, all other teasers are reduced by [(N−1)/N] percent.

Semi-Automated Selection Weight Adjustment-Case Study: Investment Ideas

Figure 9:
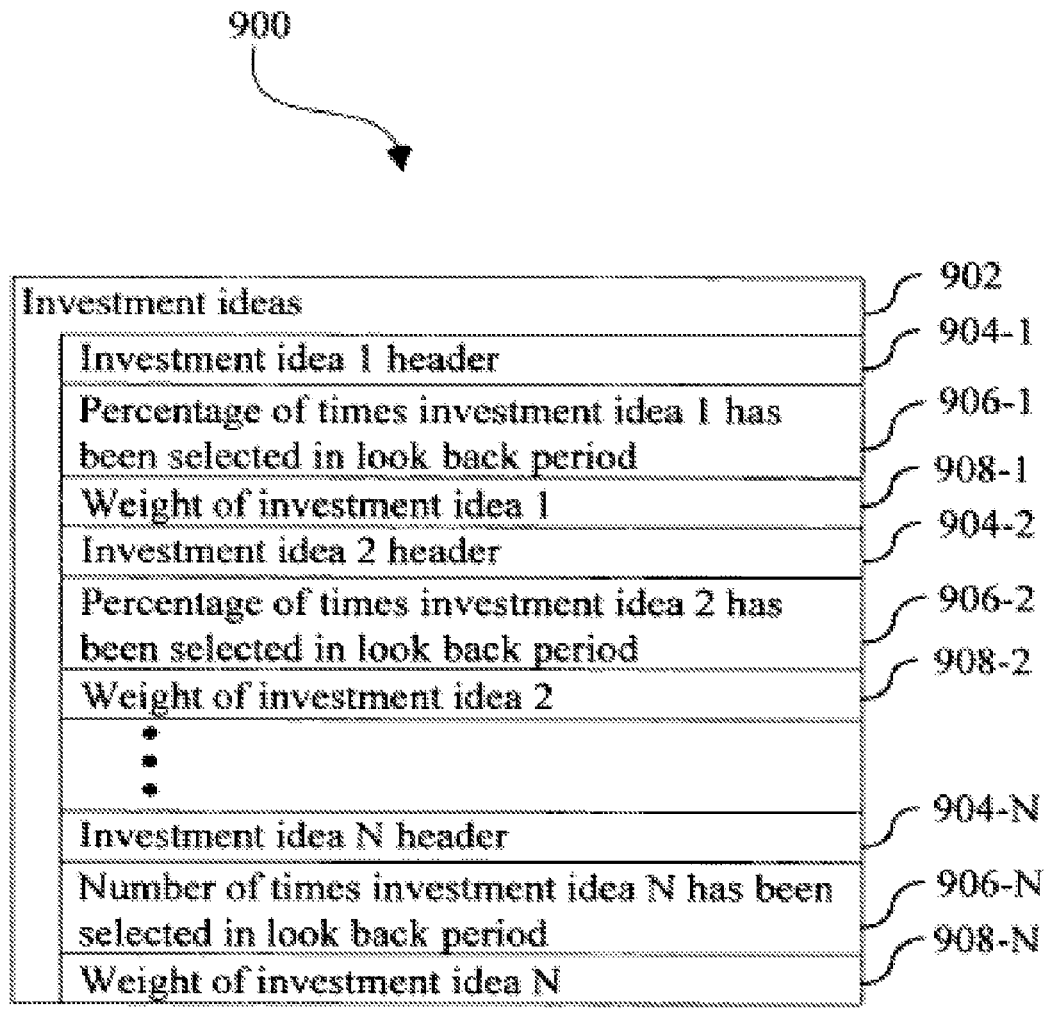
FIG. 9 illustrates a data structure for storing topics and topic selection weights in accordance with an embodiment of the present invention.
Figure 10:
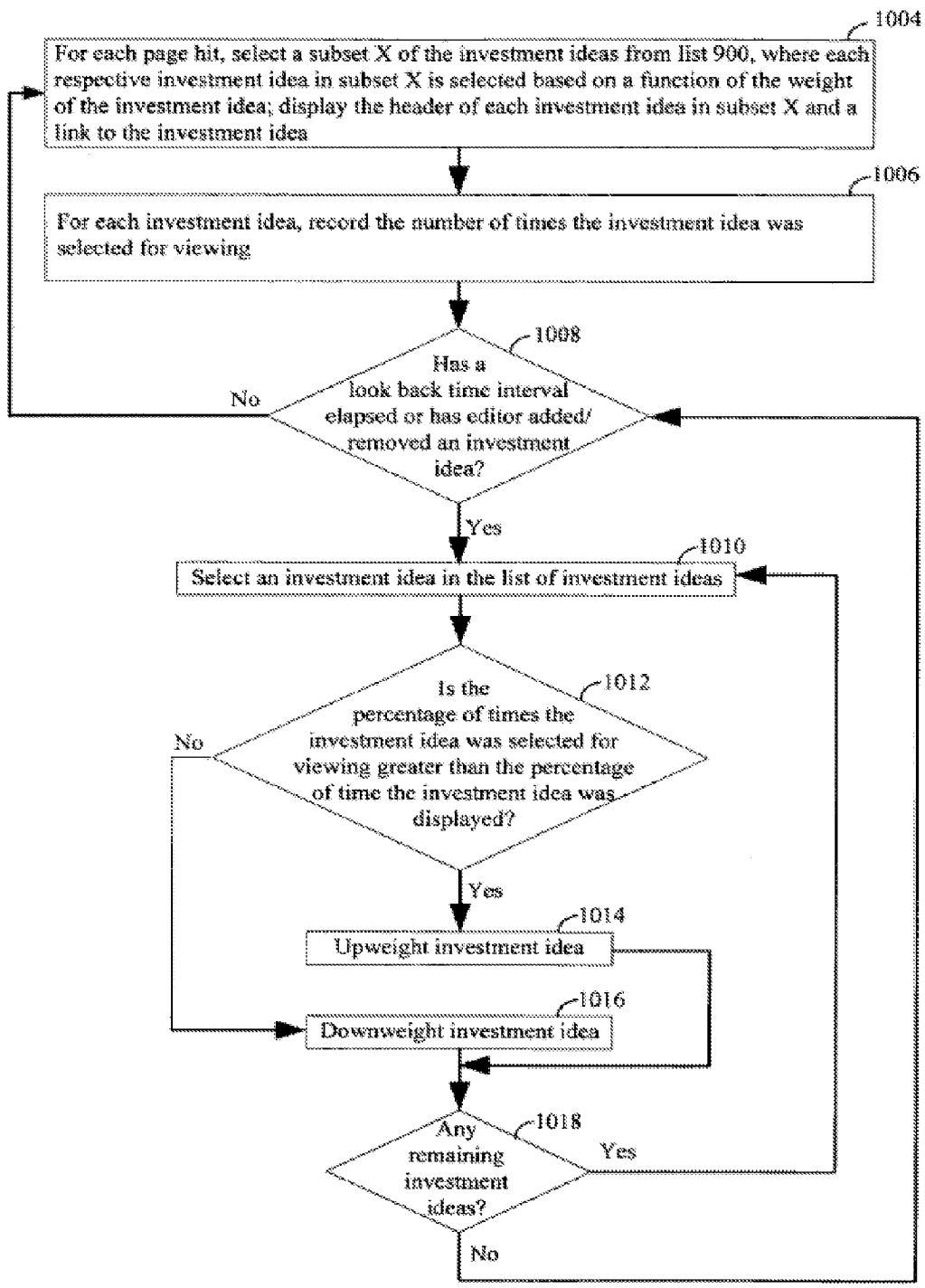
FIG. 10 illustrates processing steps that are taken to assign selection weights to topics in accordance with one embodiment of the present invention.

In some applications, one or more editors use the document popularity results such as those illustrated in FIGS. 2 and 3 to manually revise document selection weights. FIGS. 9 and 10 illustrate. Here, the documents are investment ideas. However, the techniques described in this section can be used for any form of document. Referring to FIG. 9, a data structure 900 includes a header 904 for each investment idea. In some embodiments, each header 904 includes HTML and/or other forms of content that is displayed on host web page 70 when the investment idea corresponding to the header is selected for inclusion in the web page. In some embodiments, header 904 includes a URL or other form of pointer to the corresponding investment idea. In some embodiments (not shown) each investment idea is stored in data structure 900.

Data structure 900 also includes a counter 906 for each respective investment idea that tracks the number or percentage of times an investment idea is selected by users during a periodic interval (e.g., look back period). In some embodiments, counters 906 are extended to record historical access data such as the data illustrated in FIG. 2. Data structure 900 further includes a selection weight 908 that dictates how often the investment idea corresponding to the selection weight is to be selected for inclusion in an instance of host web page 70.

FIG. 10 illustrates a method that shows how data structure 900 can be used to provide investment ideas that are of maximal interest to a user. A user requests to view a host web page 70. Accordingly, host web page 70 is dynamically constructed from the various components that make up the page 70. In the method illustrated in FIG. 10, one of the components that make up web page 70 is references (headers) to a collection of investment ideas. In step 1004 one or more investment ideas is selected from record 900 based on investment idea selection weight 908.

In step 1006, the number of times each investment idea is selected by a user during a look back period is recorded in fields 706 of data structure 700. In some embodiments such numbers are tracked in percentage form rather than absolute form. Steps 1004 and 1006 continue until a loop back interval has elapsed or an editor adds or removes an investment idea to data structure 900 (step 1008—Yes).

When step 1008—Yes arises, each respective investment idea remaining in register 700 can be assigned a new weight 908 in accordance with steps 1010 through 1018. For each respective investment idea steps 1012 through 1018 are performed. In step 1012 a determination is made as to whether the selection weight for an investment idea matches the percentage of times that the investment idea was selected by a users. To make such a determination, investment weights are expressed in percentage form. Table 5 illustrates.

TABLE 5

State information at steps 1010/1012

| Investment Idea (No.) | Selection Weight 708 [Percentile] | Number of times selected during look back periods expressed in percentile form |
|---|---|---|
| 1 | 50 | 60 |
| 2 | 10 | 8 |
| 3 | 10 | 12 |
| 4 | 10 | 14 |
| 5 | 10 | 6 |

Table 5 illustrates how investment idea number 1 was weighted such that it would be selected for inclusion in an instance of host web page 70 fifty percent of the time. However, during the look back period, investment idea number 1 was selected by users from host web page 70 sixty percent of the time. This suggests that the selection weight for investment idea number 1 should be increased to sixty percent (1012—Yes, 1014). In contrast, investment idea number five has a selection weight percentile of 10 percent but only receives six percent of the investment idea requests during a given time period. This suggests that the selection weight for investment idea number five should be decreased (1014—No, 1016).

FIG. 11 provides another illustration of the state information that can be used by an editor to upweight or downweight the selection weights 908 for investment ideas. In addition to showing selection weights 908 in absolute and percentile form, FIG. 11 illustrates the frequency at which various investment ideas are selected, which is one way to track the percentage of times each investment idea has been selected by users during the look back period. The chart in FIG. 11 also shows how long each investment idea has been posted in data structure 900. As in other embodiments described above, the editor can add investment ideas to data structure 900 with a grace period selection weight and/or remove investment ideas from data structure 900. In some embodiments, the selection weight 908 of an investment idea is automatically progressively down-weighted the longer the article is available in structure 900.

CONCLUSION

Many modifications and variations of this invention can be made without departing from its spirit and scope, as will be apparent to those skilled in the art. Reference has been made to certain computer systems. However, the present invention contemplates implementation of the inventive methods on any form of technology, whether currently existing or to be developed in the future, that implements electronic social networking. The specific embodiments described herein are offered by way of example only, and the invention is to be limited only by the terms of the appended claims, along with the full scope of equivalents to which such claims are entitled.

The invention claimed is:

1. A method for adaptively selecting documents and advertisements to be displayed on a web page comprising:
receiving a popularity value of the documents that is based on a number of selections of each of the documents;
receiving a popularity value of the advertisements that is based on a number of selections of each of the advertisements;
identifying a subset of the documents for display, wherein the subset of documents is identified based on the popularity value of the documents;
identifying at least one of the advertisements for display, wherein the at least one of the advertisements is identified based on the popularity value of the advertisements and relation to the subset of documents;
displaying the subset of the documents on the web page;
displaying the at least one of the advertisements with the subset of the documents on the web page, wherein the displayed advertisements are related to at least one of the displayed documents;
updating the subset of the documents that are identified based on a relative number of selections for each of the documents, wherein the popularity value of a particular document increases with selections of that particular document; and
updating which of the at least one of the advertisements is displayed based on selections of the at least one of the advertisements, wherein the popularity value increases for at least one of the advertisements that is displayed as a number of selections increases.

2. The method of claim 1 wherein the displaying the subset of the documents comprises displaying an indicia of each document including a corresponding link.

3. The method of claim 2 wherein an increase in a number of selections of links for a corresponding document increases the popularity value of that document.

4. The method of claim 1 further comprising:
monitoring a selection of the corresponding link for each of the documents over a time interval.

5. The method of claim 4 wherein the updating the subset of the documents is based on the monitored selection.

6. The method of claim 1 further comprising:
monitoring a selection of the at least one of the advertisements over a time interval.

7. The method of claim 6 wherein the updating which of the at least one of the advertisements is displayed is based on the monitoring.

8. The method of claim 1 wherein the document comprises a news article.

9. The method of claim 1 wherein the web page comprises a news feed that displays the subset of the documents and the at least one of the advertisements as part of the news feed.

10. The method of claim 1 wherein the popularity value of the advertisements or the documents comprises a selection weight that reflects a percentage that a particular advertisement or document, respectively, is displayed on the web page.

11. A method for determining documents to display on a web page comprising:
receiving a first request for the web page;
displaying the web page including at least one advertisement from a subset of advertisements and at least one document from a subset of documents, wherein each of the advertisements and the documents comprises a link selectable from the web page, further wherein the displayed advertisement is related to at least one of the displayed documents;
monitoring, over a time interval, a frequency of selections of each link and its corresponding advertisement or document from the web page for subsequent requests for the web page during the time interval;
determining a selection weight for each link based on a frequency of selections of each link and its corresponding document or advertisement during the time interval, wherein the selection weight for each particular link corresponds with a percentage that the particular link is displayed on the web page, such that the links with higher selection weights are displayed on the web page more frequently;

adjusting the subset of documents after expiration of the time interval by modifying which documents are in the subset based on the selection weight, wherein the at least one document that is displayed for future requests is from the adjusted subset of documents; and adjusting the subset of advertisements after expiration of the time interval by modifying which advertisements are in the subset based on the selection weight, wherein the at least one advertisement that is displayed for future requests is from the adjusted subset of advertisements.

12. The method of claim 11 further comprising:
iteratively updating the selection weight for each link after another time interval based on the frequency of selections of each link within the another time interval and adjusting the subset of advertisements and the subset of documents after expiration of the another time interval.

13. The method of claim 11 wherein the adjusting the subset of documents comprises modifying the subset of documents by adding documents whose selection weight is greater than the selection weight of existing documents from the subset of documents, further wherein the adjusting the subset of advertisements comprises modifying the subset of advertisements by adding advertisements whose selection weight is greater than the selection weight of existing advertisements from the subset of advertisements.

14. The method of claim 11 wherein the adjusting the subset of documents or the subset of advertisements comprises modifying the subset of documents or the subset of advertisements by removing documents whose selection weight is less than the selection weight of another document that is not in the subset of documents or by removing advertisements whose selection weight is less than the selection weight of another advertisements that is not in the subset of advertisements.

15. The method of claim 11 wherein the web page comprises a feed and the documents comprise links for other web pages, wherein the feed displays the advertisements with the other web page links.

16. The method of claim 11 wherein the documents comprise social media posts.

17. A method for adaptively updating a web page display comprising:
receiving a request for the web page;
displaying the web page including at least one advertisement and at least one document;
monitoring, over a time interval, a frequency of selections of the advertisements and a frequency of selections of the documents;
adjusting, after expiration of the time interval, a selection weight for the advertisements and a selection weight for the documents based on the respective frequency of selections during the time interval, wherein the selection weights corresponds with a selection popularity;
displaying the web page upon receiving another request for the web page, wherein this web page comprises at least one of the documents based on the adjusted selection weight for the documents, and at least one of the advertisements based on the adjusted selection weight for the advertisements and based on the displayed documents; and
iteratively updating the selection weight for the advertisements and the selection weight for the documents after another time interval based on the frequency of selections within the another time interval and adjusting the selection weights of the advertisements and the selection weights of the documents after expiration of the another time interval.

18. The method of claim 17 wherein the documents comprises links to other web pages and the displaying includes the at least one advertisement displayed with the other web page links.

19. The method of claim 17 wherein the documents comprise news articles and the at least one advertisement is displayed with the news articles.

20. The method of claim 17 wherein the at least one advertisement is from a subset of advertisements and the at least one document is from a subset of documents, further wherein the selection weights for the advertisements are used to modify advertisements in the subset of advertisements and the selection weights for the documents are used to modify documents in the subset of documents.

\* \* \* \* \*